(12) United States Patent
Sato

(10) Patent No.: US 12,180,026 B2
(45) Date of Patent: Dec. 31, 2024

(54) IMAGE FORMING APPARATUS

(71) Applicant: CANON KABUSHIKI KAISHA, Tokyo (JP)

(72) Inventor: Masaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 17/858,909

(22) Filed: Jul. 6, 2022

(65) Prior Publication Data

US 2023/0010017 A1    Jan. 12, 2023

(30) Foreign Application Priority Data

Jul. 9, 2021    (JP) .................................. 2021-114435

(51) Int. Cl.
| | | |
|---|---|---|
| *H04N 1/00* | (2006.01) | |
| *B65H 31/02* | (2006.01) | |
| *G03G 15/00* | (2006.01) | |
| *G03G 21/16* | (2006.01) | |

(52) U.S. Cl.
CPC ......... *B65H 31/02* (2013.01); *G03G 15/6552* (2013.01); *G03G 21/1628* (2013.01); *G03G 21/1633* (2013.01); *H04N 1/00554* (2013.01); *H04N 1/00559* (2013.01); *B65H 2601/324* (2013.01); *B65H 2801/06* (2013.01); *G03G 2215/00421* (2013.01); *G03G 2221/1687* (2013.01)

(58) Field of Classification Search
CPC ............ B65H 2402/10; B65H 2402/31; B65H 2402/60; B65H 2601/324; G03G 21/1628; G03G 21/1633; G03G 2215/00421; G03G 221/1687; H04N 1/00559; H04N 1/00554; H04N 1/00557; E05D 7/10; E05D 1/06

See application file for complete search history.

(56) References Cited

U.S. PATENT DOCUMENTS

| | | | | |
|---|---|---|---|---|
| 2005/0281607 A1* | 12/2005 | Kato | ..................... | B41J 29/02 400/693 |
| 2011/0205692 A1* | 8/2011 | Yamamoto | ......... | G03G 21/1633 361/600 |

FOREIGN PATENT DOCUMENTS

| | | | |
|---|---|---|---|
| JP | 10205522 A | * | 8/1998 |
| JP | 2000092275 A | | 3/2000 |

(Continued)

*Primary Examiner* — Luis A Gonzalez
(74) *Attorney, Agent, or Firm* — Canon U.S.A., Inc. IP Division

(57) ABSTRACT

An image forming apparatus includes an apparatus body and a moveable unit. The apparatus body includes an image forming device and a restriction portion. The moveable unit includes an image reading device and is detachably attached to the apparatus body. The moveable unit is opened and closed with respect to the apparatus body by rotation about a rotation shaft when the moveable unit is attached to the apparatus body. The moveable unit is attached to and detached from the apparatus body by moving in an axial direction of the rotation shaft. The moveable unit further includes a restricted portion that engages with the restriction portion that restricts a movement of the moveable unit in the axial direction. The restriction portion or the restricted portion further includes a deformation portion having elasticity. The deformation portion is deformed so that the moveable unit is attached to and detached from the apparatus body.

12 Claims, 13 Drawing Sheets

(56) References Cited

FOREIGN PATENT DOCUMENTS

| | | | |
|---|---|---|---|
| JP | 2017146550 A | * | 8/2017 |
| JP | 2017167530 A | | 9/2017 |

* cited by examiner

IMAGE FORMING APPARATUS

BACKGROUND

Field

The present disclosure relates to an image forming apparatus typified by a copier, a printer, and a facsimile, and more particularly to an image forming apparatus such as a multifunction peripheral including an image reading device disposed on top of an image forming device.

Description of the Related Art

Conventionally, there has been an image forming apparatus, such as a multifunction peripheral, that includes an apparatus body including an image forming device, and a unit including an image reading device disposed on top of the apparatus body (e.g., Japanese Patent Application Laid-Open No. 2017-167530). In such a multifunction peripheral, an apparatus body includes an attachment portion including a rotation shaft on a back side in an upper portion of the apparatus body, and a unit can be attached to and detached from the apparatus body in a direction of axis (hereinafter referred to as an axial direction) of the rotation shaft. The unit can be opened and closed with respect to the apparatus body about the rotation shaft. The apparatus body also includes a restriction portion that restricts a movement of the unit in the axial direction of the rotation shaft.

As in Japanese Patent Application Laid-Open No. 2017-167530, there is a multifunction peripheral designed to include a unit attached to an apparatus body. When the unit is attached to the apparatus body, the unit can usually be provided in a first position in which the unit is closed with respect to the apparatus body for image formation and a second position in which the unit is opened with respect to the apparatus body for operation such as a jam clearing operation. In each of such states, a movement of the unit in an axial direction of a rotation shaft is restricted by a restriction portion. If the unit needs to be removed from the apparatus body for cleaning of the inside of the unit or maintenance work such as repair of the unit, the unit is provided in a third position in which the unit is opened especially wider than in the second position. In the third position, the restriction portion of the apparatus body and a restricted portion of the unit are disengaged, and the movement of the unit in the axial direction of the rotation shaft is not restricted by the restriction portion of the apparatus body. In other words, the restriction of the movement of the unit or positioning of the unit is released. In this state, the unit can be detached from the apparatus body.

In the above-described configuration, however, the unit needs to be opened especially wide with respect to the apparatus body to detach the unit. Consequently, in an area in which the apparatus body and the unit interfere with each other in the course of opening of the unit, a width W of a cutout portion of the apparatus body needs to be increased so that the back of a multifunction peripheral, i.e., rear end sides of the apparatus body and the unit, is flat (FIG. 13C) while taking reduction in size of the image forming apparatus into consideration.

Such an increase in the width W of the cutout portion of the apparatus body (FIG. 13B) causes strength of the attachment portion of the apparatus body to be lower than that in a case where the cutout portion is small (FIG. 13A).

SUMMARY

According to an aspect of the present disclosure, an image forming apparatus includes an apparatus body including an image forming device and a restriction portion, and a moveable unit that includes an image reading device and is detachably attached to the apparatus body, wherein the moveable unit is configured to be opened and closed with respect to the apparatus body by rotation about a rotation shaft when the moveable unit is attached to the apparatus body, and is configured to be attached to and detached from the apparatus body by moving in an axial direction of the rotation shaft, wherein the moveable unit includes a restricted portion configured to be engaged with the restriction portion and the restriction portion is configured to restrict a movement of the moveable unit in the axial direction, wherein the restriction portion or the restricted portion includes a deformation portion having elasticity, and wherein the deformation portion is configured to be deformed so that the moveable unit is attached to and detached from the apparatus body.

Further features of the present disclosure will become apparent from the following description of exemplary embodiments with reference to the attached drawings.

DESCRIPTION OF THE EMBODIMENTS

A first exemplary embodiment of the present disclosure is described. Herein, a laser beam printer is described as an example of an image forming apparatus.

(Overall Configuration of Image Forming Apparatus)

Figure 1:
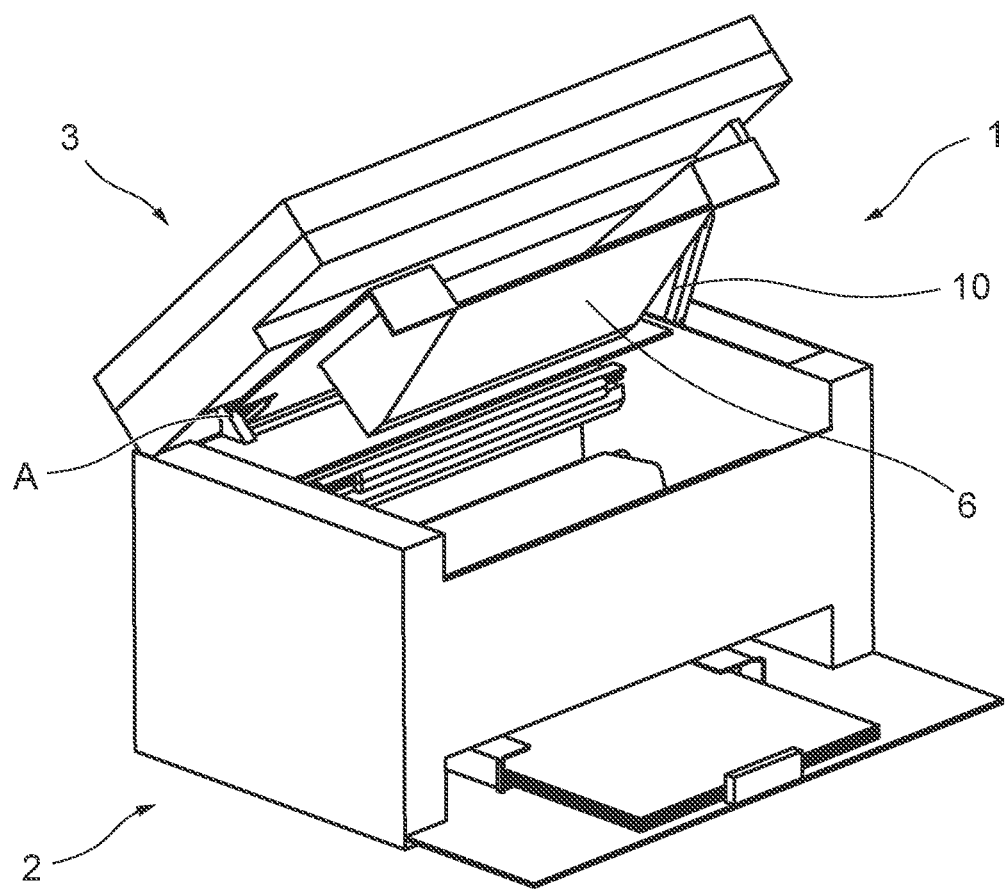
FIG. 1 is a perspective view illustrating a multifunction peripheral according to a first exemplary embodiment of the present disclosure.
Figure 2:
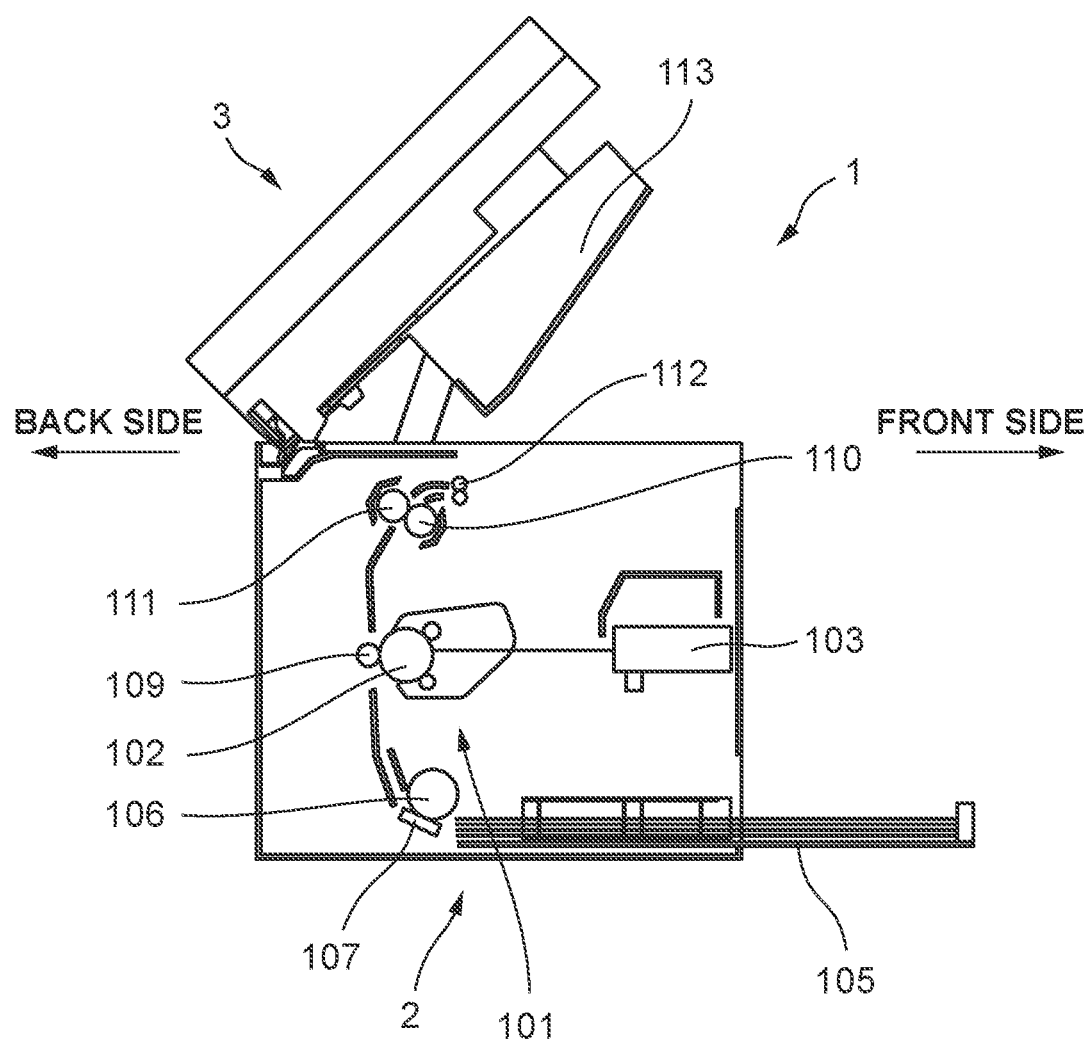
FIG. 2 is a sectional view illustrating the multifunction peripheral according to the first exemplary embodiment of the present disclosure.

First, an image forming apparatus according to the first exemplary embodiment of the present disclosure is described. FIGS. 1 and 2 are diagrams each illustrating an image forming apparatus 1 (hereinafter referred to as a multifunction peripheral 1) in which a scanner unit 3, as a unit configured to be moveable and including an image reading device, is attachable to and detachable from an upper portion of an apparatus body 2 including an image forming device. FIG. 1 illustrates a state in which the scanner unit 3 is opened with respect to the apparatus body 2. FIG. 2 is a sectional view of an internal structure of the apparatus body 2.

As illustrated in FIG. 1, the multifunction peripheral 1 broadly includes the apparatus body 2 including the image forming device and the scanner unit 3 including the image reading device. The scanner unit 3 is disposed on top of the apparatus body 2.

Herein, a direction of a sheet feeding cassette 105 with respect to the scanner unit 3 as viewed in a vertical direction is referred to as a bottom or lower side, and a direction opposite to the direction of the sheet feeding cassette 105 is referred to as an upper side for the sake of description of the present exemplary embodiment. Moreover, a front direction to the drawing surface of FIG. 2 and a rear direction to the drawing surface of FIG. 2 are respectively referred to as the left side and the right side of the multifunction peripheral 1. Moreover, as for directions orthogonal to the vertical direction and the left and right directions, a direction toward a photoconductor drum 102 from a laser unit 103 described below is referred to as a back side or the back, and a direction opposite to the direction toward the photoconductor drum 102 from the laser unit 103 is referred to as a front side or the front.

As illustrated in FIG. 1, the scanner unit 3 is rotatably attached to the apparatus body 2 about a rotational axis A in a rear portion. The apparatus body 2 and the scanner unit 3 are coupled and supported by an open-close restriction portion 10 in front of the rotational axis A.

Next, an internal structure of the apparatus body 2 is described. As illustrated in FIG. 2, the apparatus body 2 includes a process cartridge 101 and is a laser beam printer that forms an image by an electrophotographic method and records the image on a sheet as a recording material.

Sheets stored in the sheet feeding cassette 105 are separated and fed one by one by a sheet feeding roller 106 and a sheet separation unit 107 based on a print signal from a host computer (not illustrated). The separated sheet is conveyed to the photoconductor drum 102 and a transfer unit including a transfer roller 109 pressed against the photoconductor drum 102.

In the process cartridge 101, the photoconductor drum 102 as an image bearing member is rotatably disposed inside a housing. A laser beam is emitted to the charged photoconductor drum 102 based on image information, and a latent image formed by irradiation of the photoconductor drum 102 with the laser beam is developed with toner. Then, in a pressure-contact portion between the photoconductor drum 102 and the transfer roller 109, a toner image is transferred to the sheet. In addition, the laser unit 103 which irradiates the photoconductor drum 102 with the laser beam is disposed.

The sheet to which the toner image has been transferred is conveyed to a fixing unit, which includes a fixing film 110 and a pressing roller 111 pressed against the fixing film 110, and the toner image is fixed.

The sheet on which the toner image has been fixed is conveyed by a discharge roller pair 112, and then is discharged to a discharged sheet stacking unit 113 at the top of the apparatus body 2.

The scanner unit 3 includes a conventional flatbed scanner (e.g., discussed in Japanese Patent Application Laid-Open No. 2000-92275). Because an internal structure of the scanner unit 3 is similar to that of the conventional flatbed scanner, a description thereof is omitted.

(Configuration of Positioning of Printer and Scanner)

Figure 3:
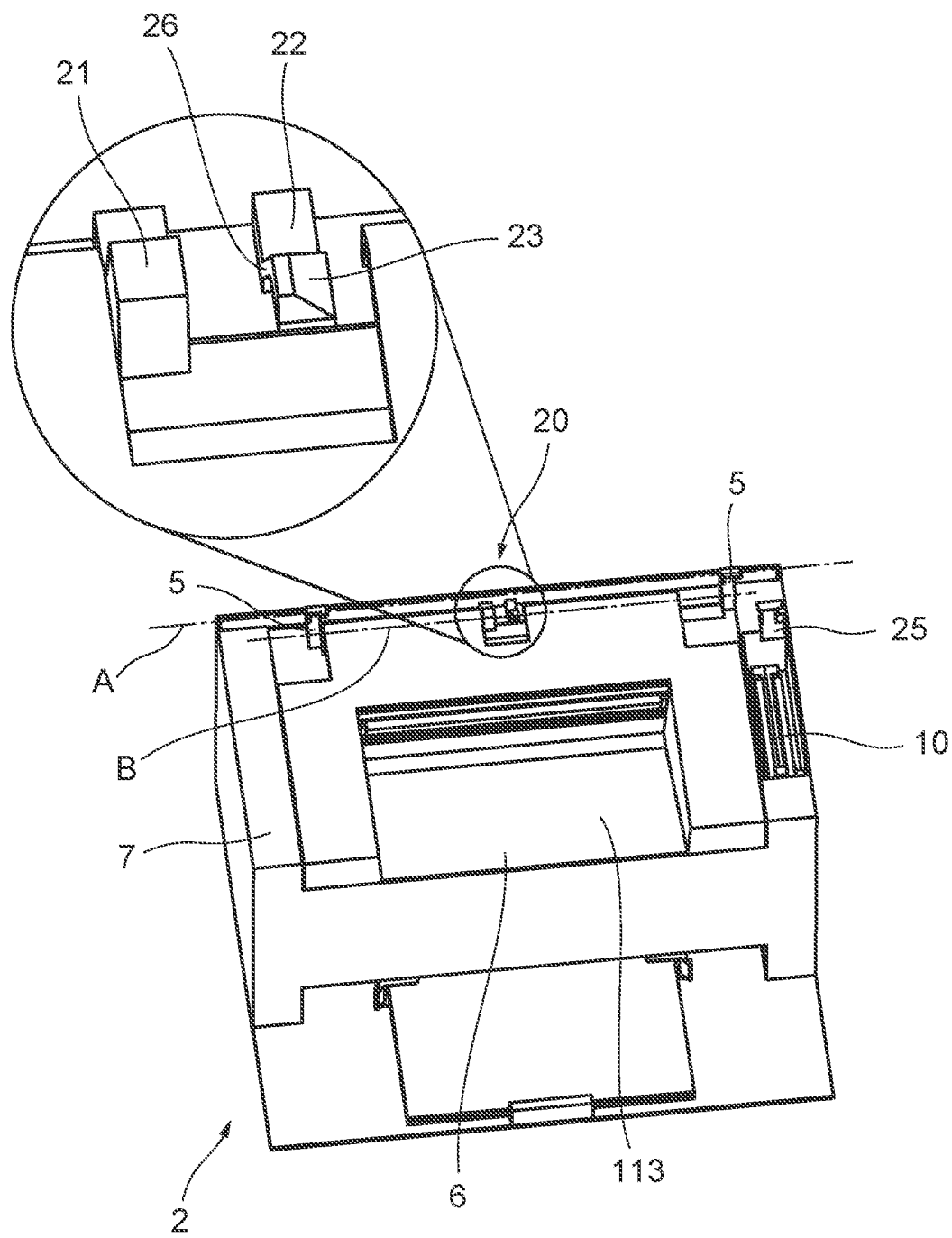
FIG. 3 is a perspective view illustrating an upper surface of an apparatus body according to the first exemplary embodiment of the present disclosure.
Figure 4:
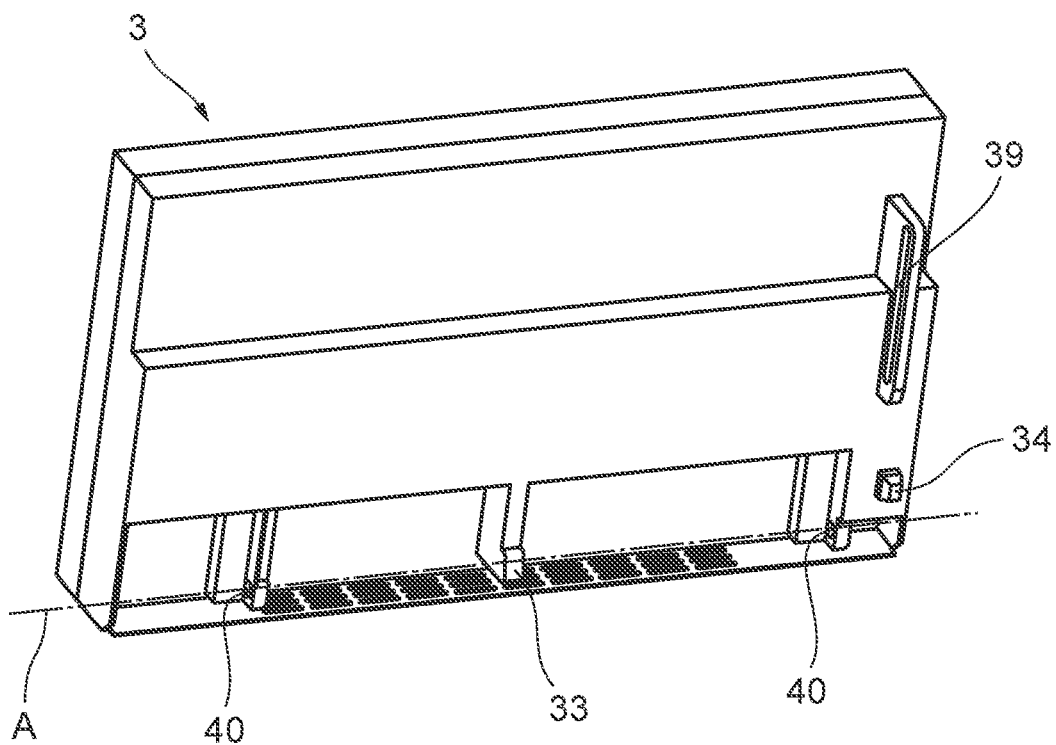
FIG. 4 is a perspective view illustrating a lower surface of a scanner unit according to the first exemplary embodiment of the present disclosure.
Figure 5:
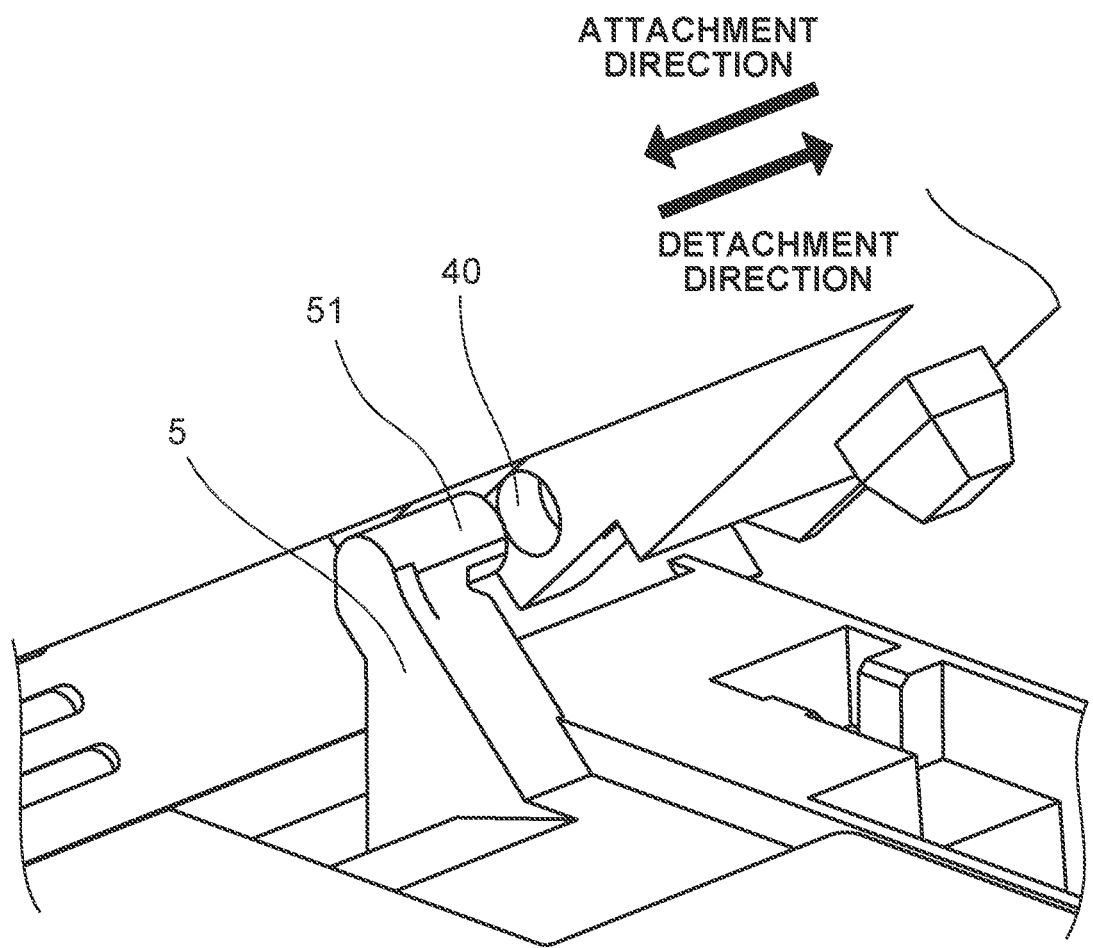
FIG. 5 is a perspective view illustrating a configuration of an attachment portion according to the first exemplary embodiment of the present disclosure.

A configuration of positioning of the apparatus body 2 and the scanner unit 3 is described with reference to FIGS. 3 to 5. FIG. 3 is a perspective view illustrating an upper portion of the apparatus body 2. FIG. 4 is a perspective view illustrating a lower portion of the scanner unit 3. FIG. 5 is a perspective view illustrating the vicinity of an attachment portion 5 when the apparatus body 2 and the scanner unit 3 are attached.

As illustrated in FIG. 3, the discharged sheet stacking unit 113 as part of a housing of the apparatus body 2 is disposed on an upper surface of an upper cover member 6. The upper cover member 6 is disposed on a frame 7 of the apparatus body 2 and can be opened and closed with respect to the apparatus body 2 about a rotational axis B.

The apparatus body 2 has two locations in which respective attachment portions 5 each including a rotation shaft 51 illustrated in FIG. 5 are disposed. The rotation shaft 51 rotatably supports the scanner unit 3 about the rotational axis A. In a direction of axis (hereinafter referred to as an axial direction) of the rotation shaft 51, the attachment portion 5 is disposed on each of both end sides in the upper portion of the apparatus body 2 on the back side of the apparatus body 2.

Moreover, the apparatus body 2 includes a first restriction portion 21 and a second restriction portion 22 that serve as a restriction portion 20 that restricts a movement of the scanner unit 3 in the axial direction. The second restriction portion 22 includes a deformation portion 26 having elasticity. The deformation portion 26 is deformable in an open-close direction of the scanner unit 3. A detailed description thereof will be provided below. The deformation portion 26 is, for example, made of a resin material and integrally formed with another portion of the restriction portion 20. The second restriction portion 22 further includes an inclined surface portion 23 that is a surface inclined in the axial direction. With respect to the axial direction, the first restriction portion 21 and the second restriction portion 22 as the restriction portion 20 are positioned between the attachment portions 5. The restriction portion 20 and the attachment portions 5 are arranged in the axial direction.

In addition, the apparatus body 2 includes an assistance portion 25 that assists restriction of a movement of the scanner unit 3 in the axial direction in a state in which the scanner unit 3 is closed with respect to the apparatus body 2. Similar to the attachment portion 5, the assistance portion 25 is disposed on the back side in the upper portion of the apparatus body 2.

The open-close restriction portion 10 is disposed on an upper right side of the apparatus body 2, and is engaged with a rail portion 39 described below to restrict an opening angle of the scanner unit 3 with respect to the apparatus body 2. Accordingly, as illustrate in FIG. 1, the scanner unit 3 and the upper cover member 6 are opened with respect to the apparatus body 2, thereby the inside of the apparatus body 2 is exposed. Thus, the process cartridge 101 can be accessed, and an operation such as a jam clearing operation can be performed.

In the lower portion of the scanner unit 3 as illustrated in FIG. 4, a hole portion 40 as a bearing is provided in a position corresponding to the rotation shaft 51 of the apparatus body 2 when the scanner unit 3 is attached to the apparatus body 2. In addition, a restricted portion 33 is disposed. A movement of the restricted portion 33 in the axial direction is restricted by the above-described restriction portion 20.

Moreover, the scanner unit 3 includes an assisted portion 34 that assists restriction of a movement of the scanner unit 3 in the axial direction in a state in which the scanner unit 3 is attached to the apparatus body 2 and closed with respect to the apparatus body 2.

In addition, a rail portion 39 is formed.

(Method for Attaching Scanner to Printer)

Figure 6A:
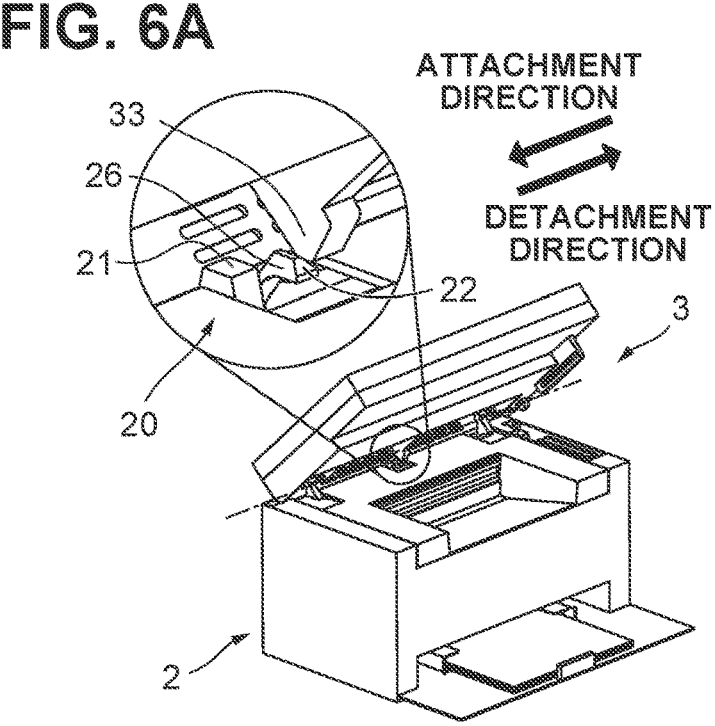
FIGS. 6A, 6B, and 6C are perspective views each illustrating attachment of the scanner unit to the apparatus body according to the first exemplary embodiment of the present disclosure.
Figure 6B:
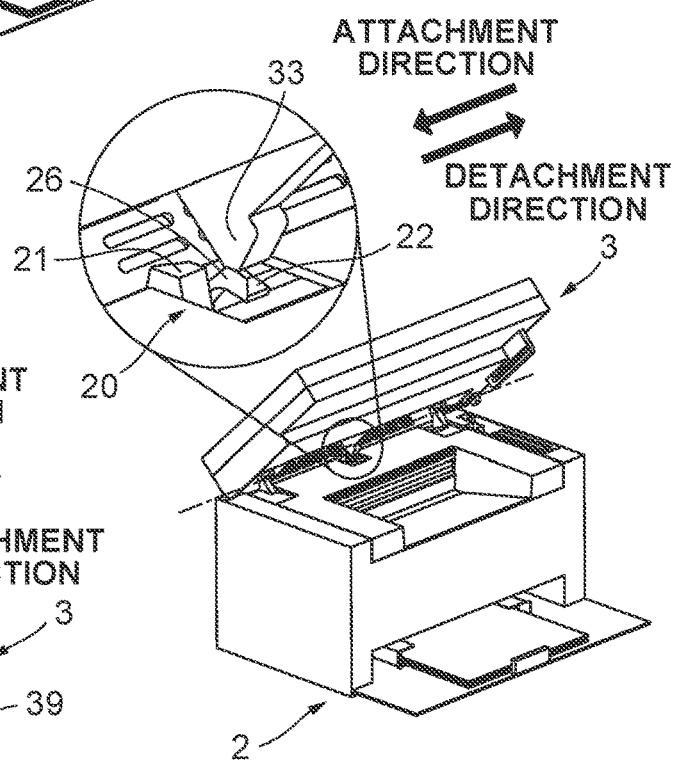
Figure 6C:
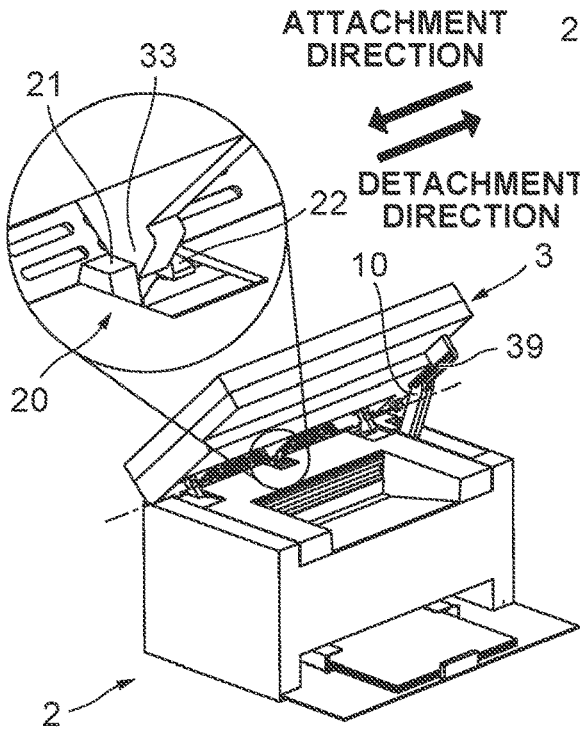
Figure 7:
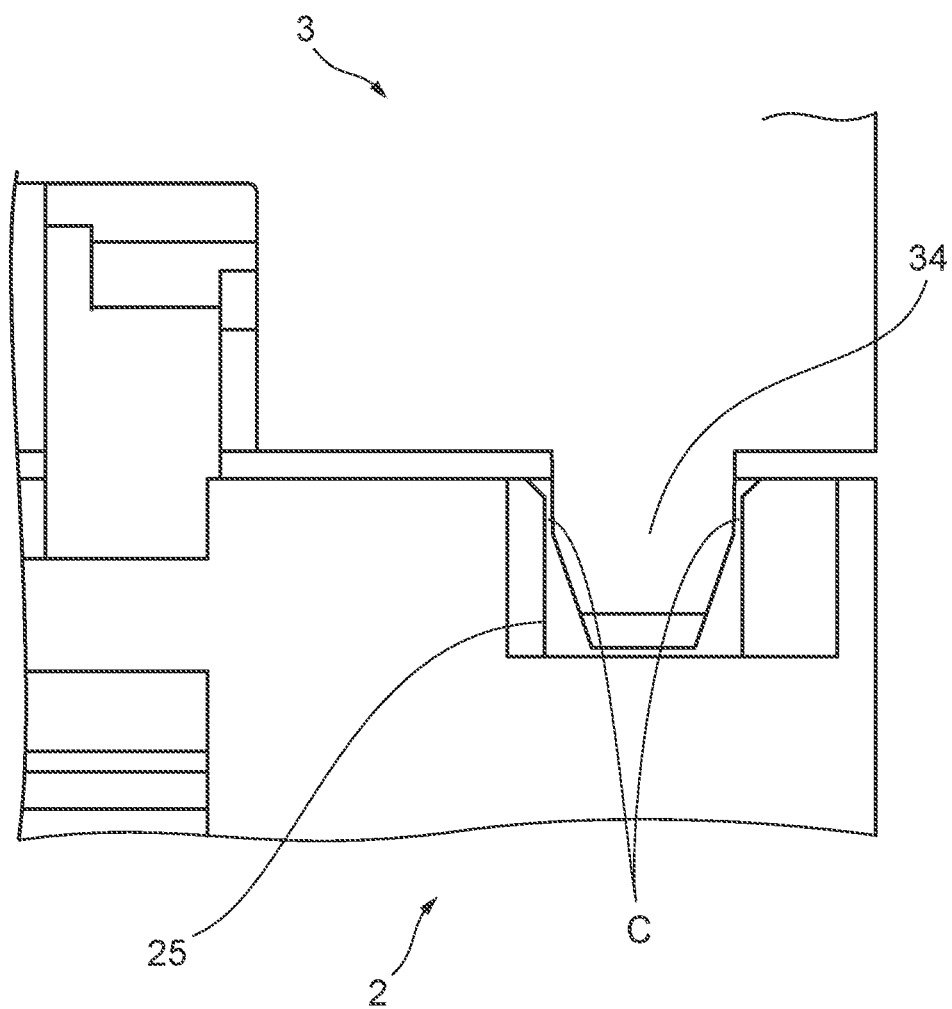
FIG. 7 is a sectional view illustrating vicinity of an assistance portion in a state in which the scanner unit is closed.
Figure 8:
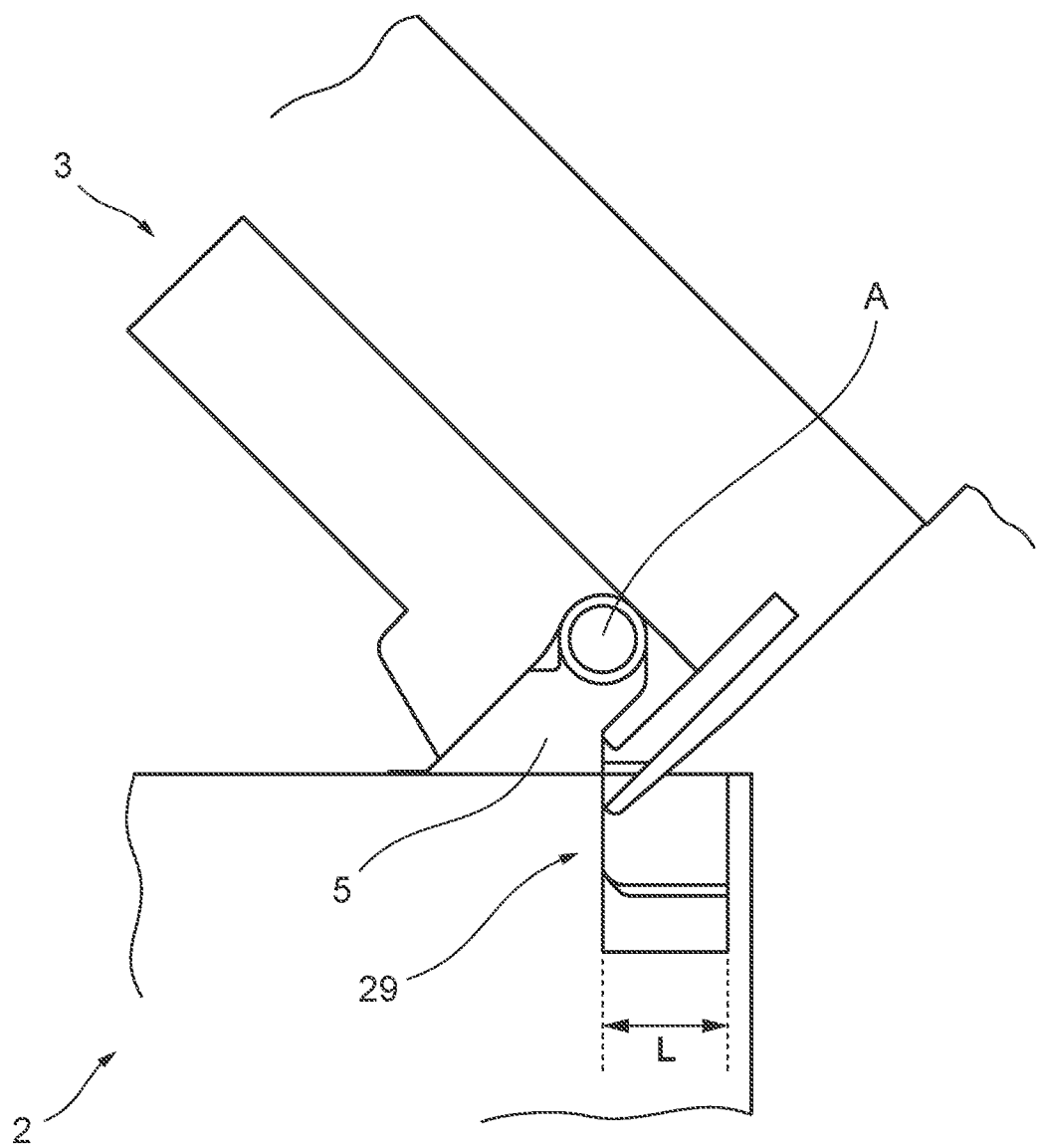
FIG. 8 is a sectional view illustrating vicinity of the attachment portion in a state in which the scanner unit is opened.

A method for attaching the scanner unit 3 to the apparatus body 2 is described with reference to FIGS. 5 to 9. FIG. 5 is a perspective view illustrating the vicinity of the attachment portion 5 at the time of attachment. FIGS. 6A, 6B, and 6C are perspective views each illustrating the whole of the apparatus body 2 and the scanner unit 3 at the time of attachment. FIG. 7 is a sectional view of the vicinity of the assistance portion 25 in a state in which the scanner unit 3 is attached to the apparatus body 2 and is closed with respect to the apparatus body 2. FIG. 8 is a sectional view of the vicinity of the attachment portion 5 in a state in which the apparatus body 2 and the scanner unit 3 are attached.

As illustrated in FIG. 5, the attachment portion 5 of the apparatus body 2 includes the rotation shaft 51. With respect to the axial direction, the rotation shaft 51 is engaged with the hole portion 40 of the scanner unit 3 which has been moved in an attachment direction, and thereby rotatably supports the scanner unit 3 with respect to the apparatus body 2. In addition, the attachment portion 5 comes into contact with the periphery of the hole portion 40 of the scanner unit 3 in a state in which the scanner unit 3 is attached. Thus, with respect to the axial direction, the attachment portion 5 restricts a move of the scanner unit 3 in the attachment direction.

With respect to the axial direction, the attachment portion 5 and the hole portion 40 are disposed in each of both end portions. Although FIG. 5 illustrates only one of the end portions, the other of the end portions has a similar configuration. In the present exemplary embodiment, the apparatus body 2 includes the attachment portion 5 including the rotation shaft 51, and the scanner unit 3 includes the hole portion 40. Alternatively, the scanner unit 3 may include a rotation shaft, and the apparatus body 2 may include a bearing to be engaged with the rotation shaft.

FIGS. 6A, 6B, and 6C are diagrams respectively illustrating a first state, a second state, and a third state in a case where the scanner unit 3 is attached to the apparatus body 2. In the present exemplary embodiment, the scanner unit 3 is attached to the apparatus body 2 by being moved in the axial direction with respect to the apparatus body 2. In the first state illustrated in FIG. 6A, the second restriction portion 22 as the restriction portion 20 of the apparatus body 2 and the restricted portion 33 of the scanner unit 3 are in contact with each other. More specifically, the second restriction portion 22 includes the inclined surface portion 23 as illustrated in FIG. 3, and the inclined surface portion 23 of the second restriction portion 22 and the restricted portion 33 are in contact with each other in the first state.

In the second state illustrated in FIG. 6B, the scanner unit 3 moves to the left side in the axial direction from the first state, and the deformation portion 26 of the second restriction portion 22 is deformed. As illustrated in FIG. 6B, the deformation portion 26 is configured to be deformable in a downward direction. When the scanner unit 3 is moved toward the left with respect to the axial direction from the first state, the restricted portion 33 presses the inclined surface portion 23 toward the left with respect to the axial direction. Upon receipt of such a pressing force, the deformation portion 26 is deformed, and the second restriction portion 22 is deformed in the downward direction.

FIG. 6C illustrates the third state in which the scanner unit 3 is further moved toward the left with respect to the axial direction from the second state, and the scanner unit 3 is attached to the apparatus body 2. In this state, the restricted portion 33 is positioned between the first restriction portion 21 and the second restriction portion 22 and engaged with the restriction portion 20, and the deformation portion 26 returns to a pre-deformation state.

In this state, moreover, the first restriction portion 21 restricts a movement of the scanner unit 3 toward the left with respect to the axial direction. The left represents a direction in which the scanner unit 3 is attached to the apparatus body 2. In this state, moreover, the second restriction portion 22 restricts a movement of the scanner unit 3 toward the right with respect to the axial direction. The right represents a direction in which the scanner unit 3 is detached from the apparatus body 2. Accordingly, a movement of the scanner unit 3 in the axial direction is restricted by the restricted portion 33 being restricted by the restriction portion 20. Thus, the scanner unit 3 is positioned with respect to the apparatus body 2.

Such a configuration enables the scanner unit 3 to be attached to the apparatus body 2 simply by application of a force in an attachment direction with respect to the apparatus body 2. Moreover, the use of deformation of the deformation portion 26 enables the scanner unit 3 to be attached and detached without the scanner unit 3 being opened especially wide with respect to the apparatus body 2.

Next, a method for detaching the scanner unit 3 from the apparatus body 2 is described. As for the detachment method, in a state in which the open-close restriction portion 10 is disengaged from the rail portion 39, the scanner unit 3 is moved toward the right with respect to the axial direction. The right represents a direction opposite to the direction in which the scanner unit 3 is moved to be attached to the apparatus body 2. Such a rightward movement of the scanner unit 3 enables the scanner unit 3 to be detached.

The restricted portion 33 comes into contact with a portion of the second restriction portion 22 other than the inclined surface portion 23. Such contact restricts a rightward movement of the restricted portion 33. Thus, even if the scanner unit 3 is urged to move toward the right, which is a detachment direction, the deformation portion 26 is not deformed. Consequently, a movement of the scanner unit 3 in the detachment direction in a state in which the deformation portion 26 is, for example, deformed with a finger of a user or maintenance service person enables the scanner unit 3 to be detached from the apparatus body 2.

FIG. 7 is a sectional view illustrating the vicinity of the assistance portion 25 in a state in which the scanner unit 3 is attached to the apparatus body 2 and is closed. The scanner unit 3 is attached to the apparatus body 2, and the assisted portion 34 of the scanner unit 3 is fitted into the assistance portion 25 of the apparatus body 2 with a clearance C therebetween in a state in which the scanner unit 3 is closed. Due to the clearance C, the assistance portion 25 and the assisted portion 34 do not contact each other when a force in the axial direction is not applied by the scanner unit 3 to the apparatus body 2.

In a state in which the scanner unit 3 receives the force in the axial direction, the assistance portion 25 and the assisted portion 34 contact each other so as to support the force from the axial direction because the clearance C is small. The assistance portion 25 and the assisted portion 34 are disposed on the back side of the multifunction peripheral 1 in the same manner as the attachment portion 5 and the restriction portion 20. Such a configuration enables an external force to be supported in a shared manner such that a strong force is not applied to the attachment portion 5, the restriction portion 20, the deformation portion 26, or the like even in a case where the external force is generated in the axial direction, for example, during transport of the multifunction peripheral 1.

As illustrated in FIG. 8, the apparatus body 2 includes a cutout portion 29. The cutout portion 29 is a groove arranged in the axial direction in the upper portion of the apparatus body 2. If the scanner unit 3 is opened with respect to the apparatus body 2, part of the scanner unit 3 enters the cutout portion 29. A width L of the cutout portion 29 needs to be greater to allow the scanner unit 3 to open wider with respect to the apparatus body 2. However, since an increase in the width L of the cutout portion 29 lowers strength of the attachment portion 5, the width L of the cutout portion 29 is desirably small.

In the present exemplary embodiment, there has been described the method which enables the scanner unit 3 to be attached to and detached from the apparatus body 2 by using deformation of the deformation portion 26 without the scanner unit 3 being opened especially wide with respect to the apparatus body 2. As the opening position of the scanner unit 3 when the scanner unit 3 is attached to and detached from the apparatus body 2, for example, an opening position of the scanner unit 3 for an operation such as jam clearing operation may be set. Accordingly, the width L of the cutout portion 29 becomes smaller, and strength of the attachment portion 5 can be enhanced.

A second exemplary embodiment of the present disclosure is described. Configurations similar to the above-described configurations are given the same reference numerals, and redundant descriptions thereof are omitted.
(Configuration of Positioning of Printer and Scanner)

A configuration of positioning of an apparatus body 2 and a scanner unit 3 according to the second exemplary embodiment of the present disclosure is described with reference to FIGS. 9 to 12.

Figure 9:
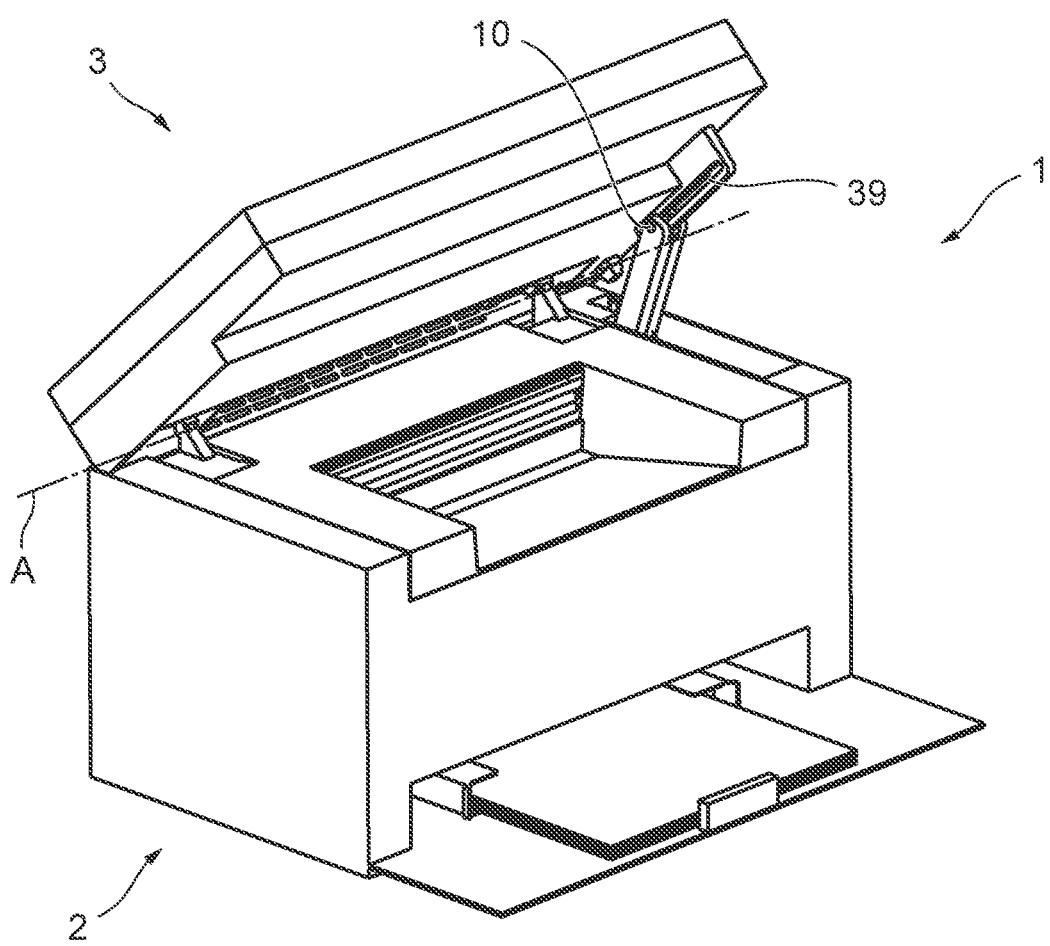
FIG. 9 is a perspective view illustrating a multifunction peripheral according to a second exemplary embodiment of the present disclosure.
Figure 10:
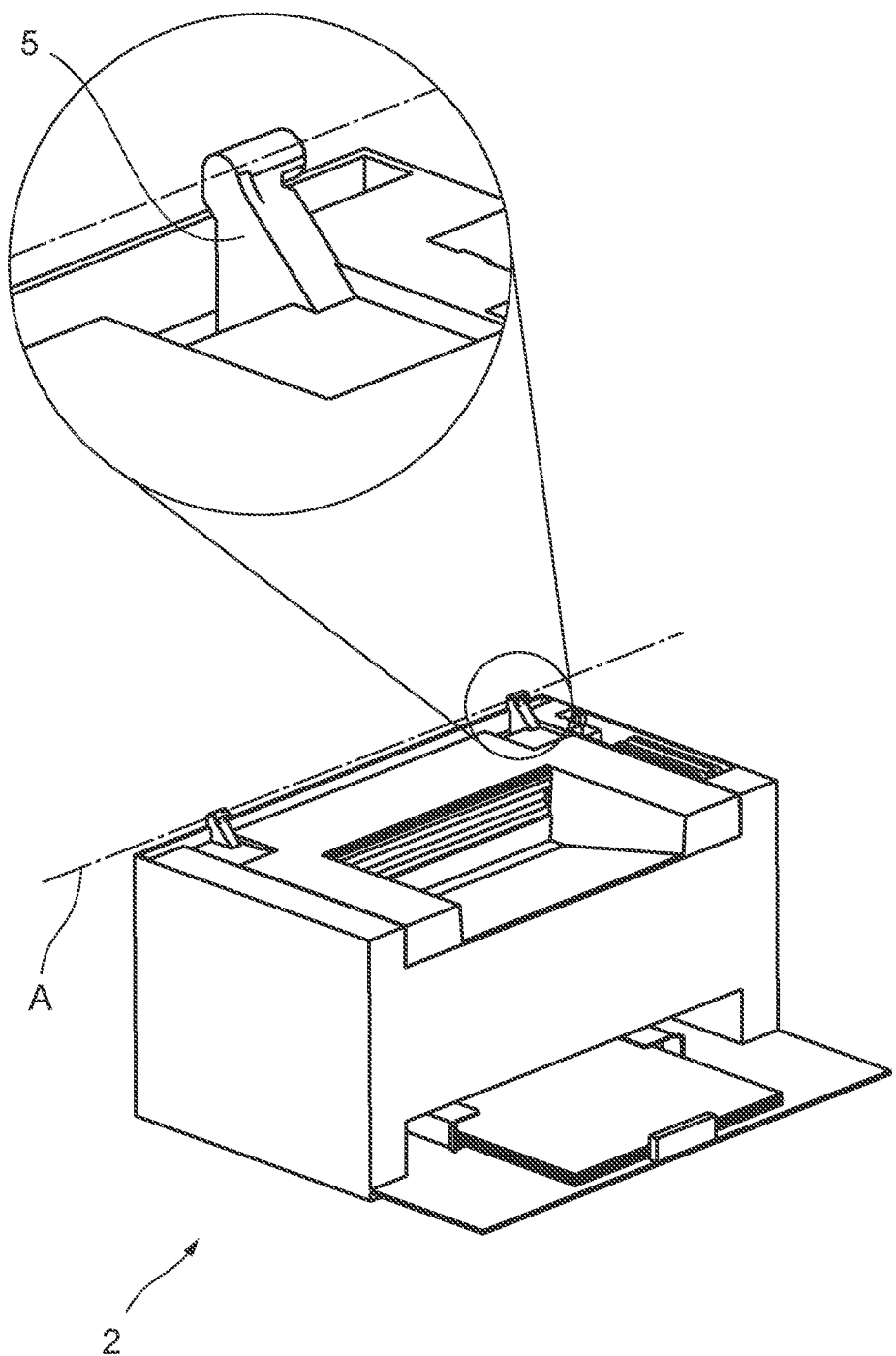
FIG. 10 is a perspective view illustrating an attachment portion according to the second exemplary embodiment of the present disclosure.
Figure 11:
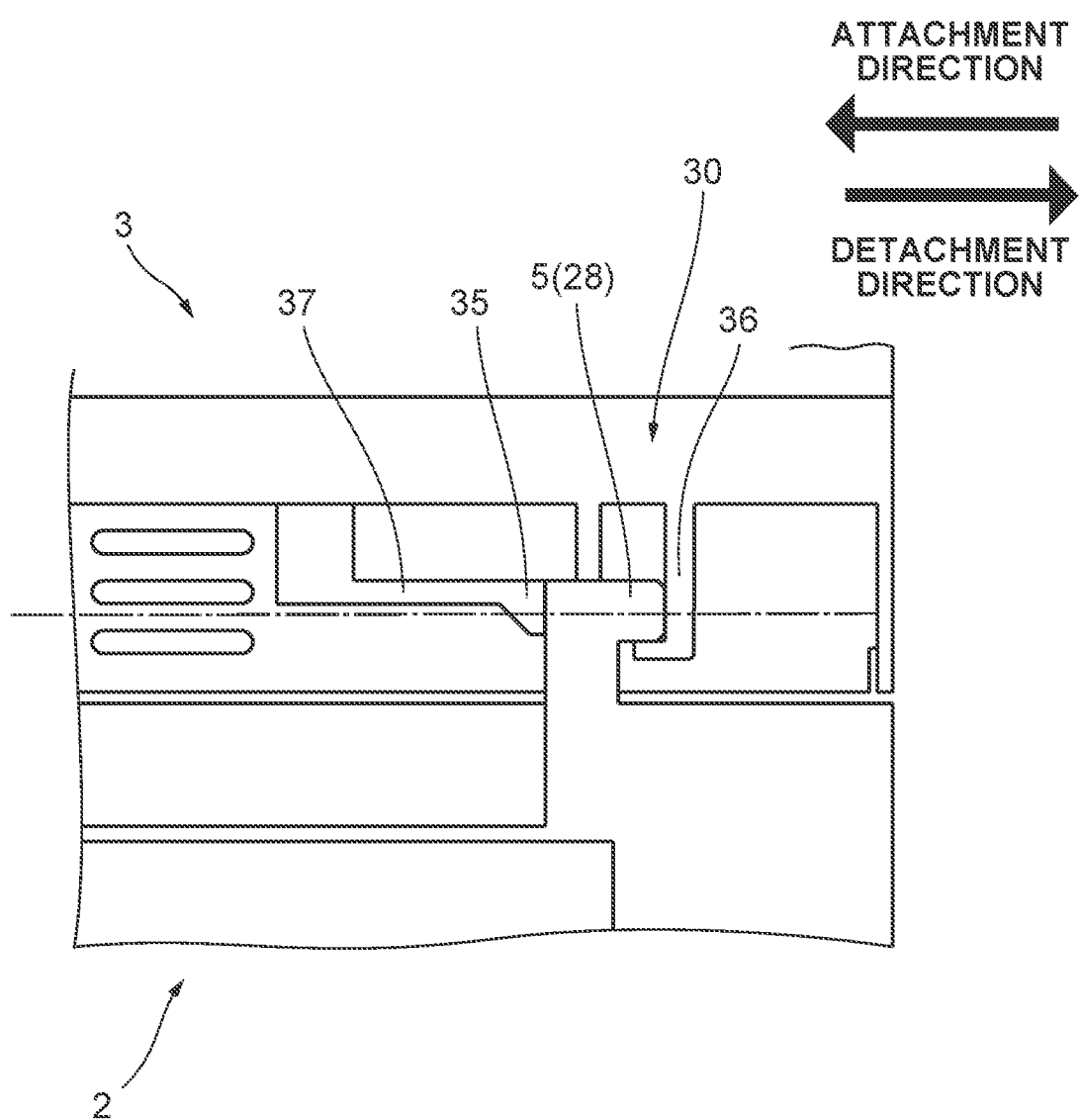
FIG. 11 is a sectional view illustrating a state in which a scanner unit and an apparatus body are attached according to the second exemplary embodiment of the present disclosure.
Figure 12:
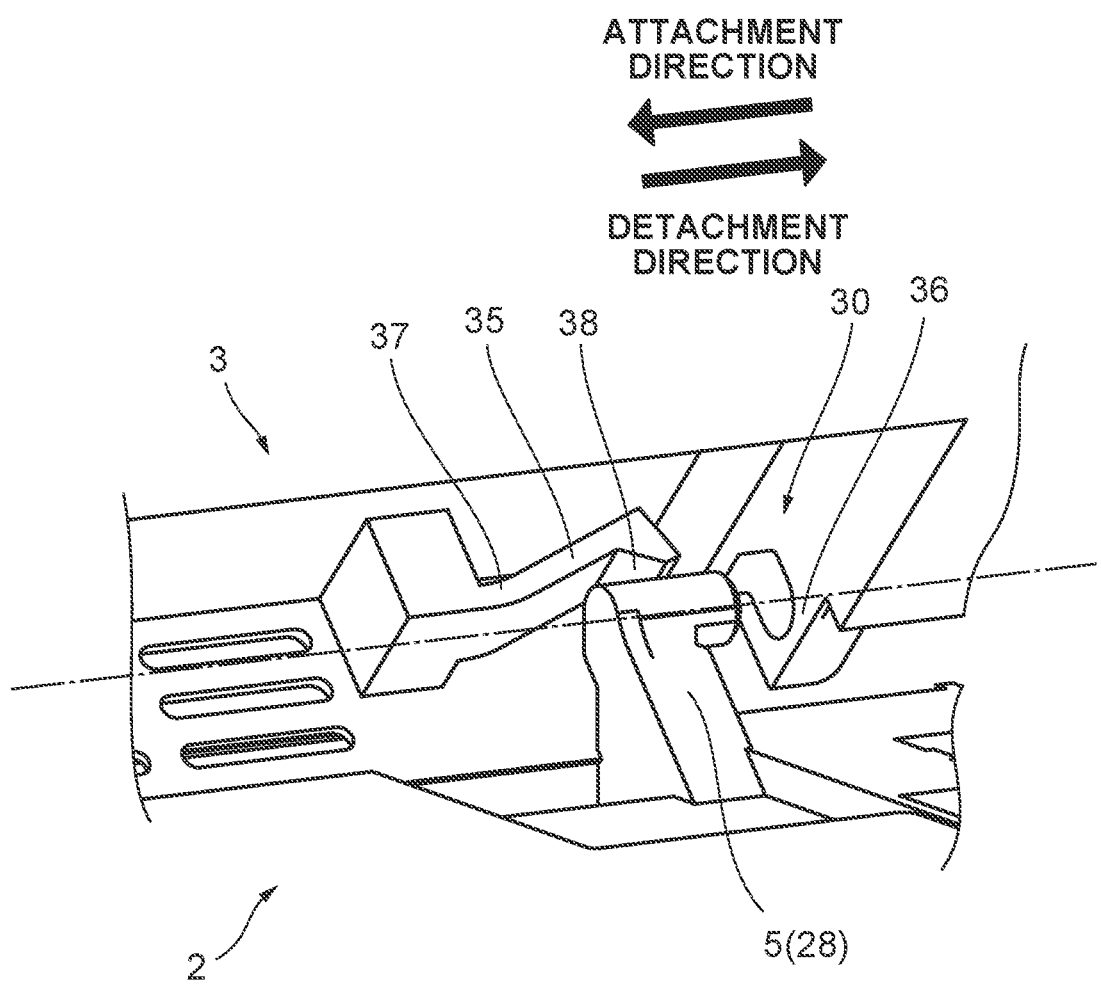
FIG. 12 is a perspective view illustrating vicinity of the attachment portion according to the second exemplary embodiment of the present disclosure.
Figure 13A:
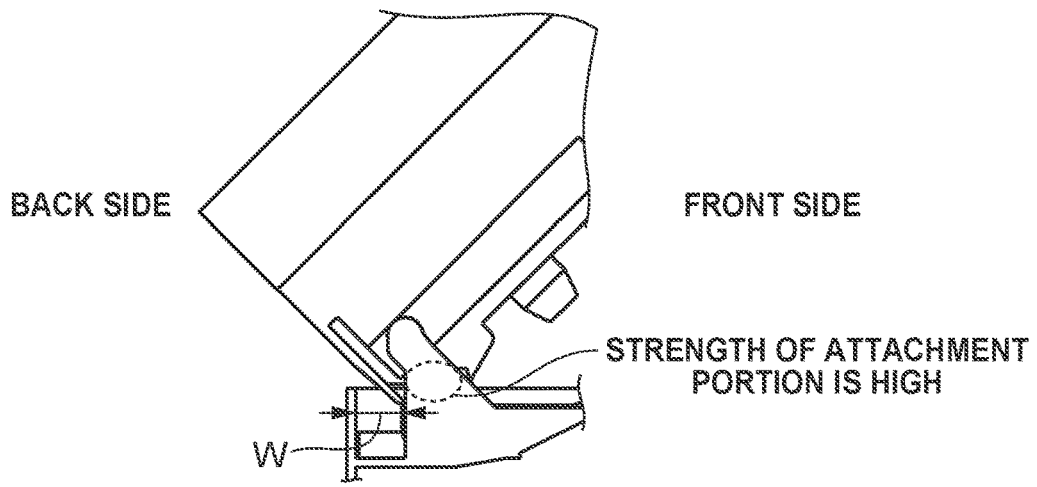
FIGS. 13A, 13B, and 13C are diagrams each illustrating a multifunction peripheral as seen from a side to indicate an issue.
Figure 13B:
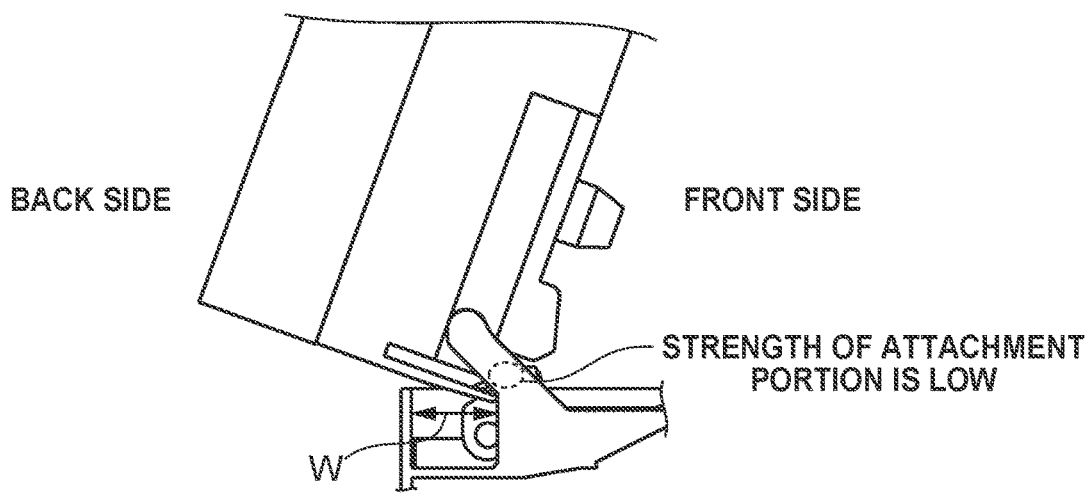
Figure 13C:
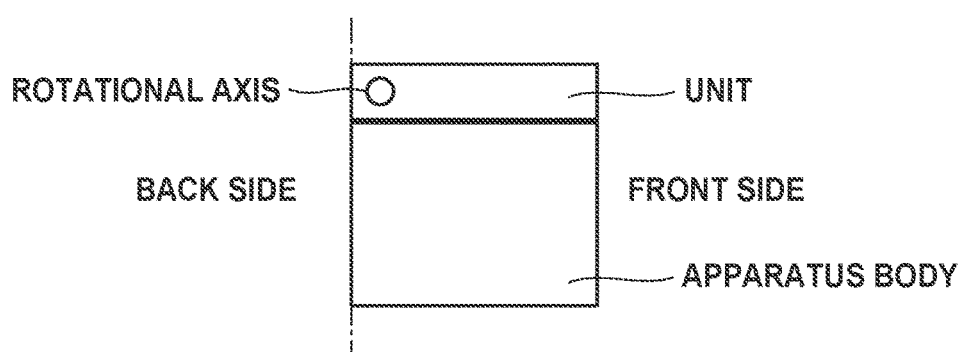

FIG. 9 is a perspective view illustrating a multifunction peripheral 1 according to the second exemplary embodiment of the present disclosure. FIG. 10 is a perspective view illustrating an attachment portion 5 of the apparatus body 2. FIG. 11 is a sectional view illustrating a state in which the apparatus body 2 and the scanner unit 3 are attached. FIG. 12 is a perspective view illustrating the vicinity of the attachment portion 5.

In the present exemplary embodiment, as illustrated in FIG. 10, positioning of the apparatus body 2 and the scanner unit 3 in the axial direction can be performed by the attachment portion 5 on the right side of the apparatus body 2. A structure of the attachment portion 5 is similar to that in the first exemplary embodiment. A method for attaching the scanner unit 3 to the apparatus body 2 according to the present exemplary embodiment is described.

As illustrated in FIG. 11, the attachment portion 5 on the right side of the apparatus body 2 also functions as a restriction portion that restricts a movement of the scanner unit 3 in the axial direction. In the present exemplary embodiment, the attachment portion 5 on the right side is also referred to as a restriction portion 28. In the present exemplary embodiment, the scanner unit 3 includes a first restricted portion 35 and a second restricted portion 36 that serve as a restricted portion 30. The first restricted portion 35 includes a deformation portion 37 having elasticity. In addition, as illustrated in FIG. 12, the first restricted portion 35 includes an inclined surface portion 38. In other words, the restricted portion 30 of the scanner unit 3 includes the first restricted portion 35, the second restricted portion 36, the deformation portion 37, and the inclined surface portion 38.

When the scanner unit 3 is to be attached to the apparatus body 2, the scanner unit 3 is moved toward the left with respect to the axial direction, which is the attachment direction, and the restriction portion 28 and the inclined surface portion 38 come into contact with each other.

If the scanner unit 3 is further moved toward the left, the restriction portion 28 presses the inclined surface portion 38 as illustrated in FIG. 12, and the deformation portion 37 is deformed. If the scanner unit 3 is further moved toward the left, the scanner unit 3 is attached to the apparatus body 2 as illustrated in FIG. 11, and the restriction portion 28 is positioned between the first restricted portion 35 and the second restricted portion 36.

In a state in which the scanner unit 3 is attached to the apparatus body 2, with respect to the axial direction, a movement of the first restricted portion 35 in a direction in which the scanner unit 3 is detached from the apparatus body 2 is restricted by the restriction portion 28. With respect to the axial direction, a movement of the second restricted portion 36 in a direction in which the scanner unit 3 is attached to the apparatus body 2 is restricted by the restriction portion 28.

As in the first exemplary embodiment, when the scanner unit 3 is to be detached, for example, a finger of a user or maintenance service person is used to deform the deformation portion 37 in a state in which the open-close restriction portion 10 is disengaged from the rail portion 39. The restriction of the scanner unit 3 in the axial direction is released by the deformation of the deformation portion 37, so that the scanner unit 3 can be moved and detached.

In the present exemplary embodiment, one of the attachment portions 5 serves as the restriction portion 28, and both ends of the restriction portion 28 in the axial direction are held by the restricted portion 30 of the scanner unit 3. However, in the apparatus body 2, the attachment portion 5 and the restriction portion 28 may be separate portions. In such a case, for example, a restriction portion 28 can be separately disposed between two attachment portions 5 as in the first exemplary embodiment. Alternatively, both attachment portions 5 may be configured to serve as restriction portions 28.

According to the present exemplary embodiment, since the scanner unit 3 can be removed without the scanner unit 3 being widely opened with respect to the apparatus body 2, an effect similar to that obtained in the first exemplary embodiment can be obtained. Moreover, with respect to the axial direction, the restriction portion 28 and the restricted portions 35 and 36 are disposed away from the center of the multifunction peripheral 1. Thus, there is no member that blocks airflow in the center, so that more space is provided. Generally, in a configuration in which a scanner unit is opened and closed, a discharged sheet stacking unit is small, and the airflow tends to be decreased. Consequently, issues such as a temperature rise and condensation in a sheet discharge unit or a lower portion of the scanner unit may occur. In such a case, since the configuration according to the present exemplary embodiment provides more space in a center portion, the airflow is improved, and thus the temperature rise and condensation do not tend to occur.

Moreover, each of the first and second exemplary embodiments has been described using the example in which the deformation portion is made of a resin material and integrally formed with another portion of the restriction portion or the restricted portion. However, the deformation portion may be configured as a separate member having elasticity such as a spring member. In such a case, deformation of the deformation portion can be used such that the restriction portion according to the first exemplary embodiment or the restricted portion according to the second exemplary embodiment can be moved and displaced.

According to each of the exemplary embodiments of the present disclosure, the use of deformation of the deformation portion disposed in the restricted portion or the restriction portion that restricts a movement of the unit enables the unit to be moved in the axial direction of the rotation shaft, and thus the unit can be attached to and detached from the apparatus body without the unit being opened especially wide with respect to the apparatus body. Thus, in a portion in which the apparatus body and the unit interfere with each other, the size of the cutout portion of the apparatus body can be reduced, and strength of the attachment portion for attachment of the unit to the apparatus body can be enhanced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-114435, filed Jul. 9, 2021, which is hereby incorporated by reference herein in its entirety.

What is claimed is:

1. An image forming apparatus comprising:
   an apparatus body including an image forming device, a restricting portion, and a receiving portion; and
   a moveable unit including an image reading device and a received portion,
   wherein the moveable unit is detachably attached to the apparatus body,
   wherein the moveable unit is configured to be opened and closed with respect to the apparatus body by rotation about a rotation shaft when the moveable unit is attached to the apparatus body, and is configured to be attached to and detached from the apparatus body by moving in an axial direction of the rotation shaft,
   wherein, in a state where the moveable unit is attached to the apparatus body, the received portion engages with the receiving portion when the moveable unit is closed with respect to the apparatus body, and disengages from the receiving portion when the moveable unit is opened with respect to the apparatus body,
   wherein, in a state where the received portion engages with the receiving portion, the received portion contacts the receiving portion when a force is applied to the moveable unit in the axial direction,
   wherein the moveable unit includes a restricted portion configured to be engaged with the restricting portion and the restricting portion is configured to restrict a movement of the moveable unit in the axial direction,
   wherein the restricting portion or the restricted portion includes a deformation portion having elasticity, and
   wherein the deformation portion is configured to be deformed so that the moveable unit is attachable to and detachable from the apparatus body.

2. The image forming apparatus according to claim 1,
   wherein the apparatus body includes an attachment portion to which the moveable unit is attached, and
   wherein the attachment portion includes the rotation shaft.

3. The image forming apparatus according to claim 2, wherein the attachment portion is a plurality of attachment portions and, with respect to the axial direction, the plurality of attachment portions is disposed on each of both end sides in an upper portion on a back side of the apparatus body.

4. The image forming apparatus according to claim 3,
   wherein, with respect to the axial direction, the restricting portion is positioned between the plurality of attachment portions, and
   wherein the restricting portion and the plurality of attachment portions are arranged in the axial direction.

5. The image forming apparatus according to claim 3, wherein at least one of the plurality of attachment portions serves as the restricting portion to restrict a movement of the moveable unit in the axial direction.

6. The image forming apparatus according to claim 1,
   wherein the restricting portion includes a first restricting portion and a second restricting portion that are arranged in the axial direction,
   wherein, with respect to the axial direction, the first restricting portion restricts a movement of the moveable unit in a direction in which the moveable unit is attached to the apparatus body,
   wherein, with respect to the axial direction, the second restricting portion restricts a movement of the moveable unit in a direction in which the moveable unit is detached from the apparatus body,
   wherein the deformation portion is provided in the second restricting portion, and
   wherein, when the moveable unit is attached to the apparatus body, the restricted portion is positioned between the first restricting portion and the second restricting portion.

7. The image forming apparatus according to claim 1,
   wherein the restricted portion includes a first restricted portion and a second restricted portion that are arranged in the axial direction,
   wherein, with respect to the axial direction, the first restricted portion is provided such that a movement of the moveable unit in a direction in which the moveable unit is detached from the apparatus body is restricted,
   wherein, with respect to the axial direction, the second restricted portion is provided such that a movement of the moveable unit in a direction in which the moveable unit is attached to the apparatus body is restricted,
   wherein the deformation portion is provided in the first restricted portion, and
   wherein, when the moveable unit is attached to the apparatus body, the restricting portion is positioned between the first restricted portion and the second restricted portion.

8. The image forming apparatus according to claim 1,
   wherein the restricting portion or the restricted portion includes an inclined surface portion inclined with respect to the axial direction, and wherein, when the moveable unit is attached to the apparatus body, the inclined surface portion is pressed so that the deformation portion is deformed.

9. The image forming apparatus according to claim 1, wherein the deformation portion includes a base portion and a tip end portion with respect to a direction perpendicular to the axial direction, and the tip end portion is moved relative to the base portion when the deformation portion is deformed.

10. The image forming apparatus according to claim 1, wherein the received portion is a projection and the receiving portion is an opening to which the projection is inserted.

11. The image forming apparatus according to claim 10, wherein the projection extends downward.

12. The image forming apparatus according to claim 1, wherein the deformation portion is configured to be deformed downward so that the moveable unit is attachable to and detachable from the apparatus body.

* * * * *